US009929421B2

(12) United States Patent
Jiang et al.

(10) Patent No.: US 9,929,421 B2
(45) Date of Patent: *Mar. 27, 2018

(54) MEMBRANE ELECTRODE ASSEMBLY OF FUEL CELL

(71) Applicants: Tsinghua University, Beijing (CN); HON HAI PRECISION INDUSTRY CO., LTD., New Taipei (TW)

(72) Inventors: Kai-Li Jiang, Beijing (CN); Jia-Ping Wang, Beijing (CN); Shou-Shan Fan, Beijing (CN); Xiao-Yang Lin, Beijing (CN); Peng Liu, Beijing (CN); Shu Luo, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 605 days.

This patent is subject to a terminal disclaimer.

(21) Appl. No.: 14/526,456

(22) Filed: Oct. 28, 2014

(65) Prior Publication Data

US 2016/0028097 A1   Jan. 28, 2016

(30) Foreign Application Priority Data

Jul. 25, 2014   (CN) .......................... 2014 1 0358042

(51) Int. Cl.
*H01M 8/10* (2016.01)
*H01M 8/1004* (2016.01)
(Continued)

(52) U.S. Cl.
CPC ....... *H01M 8/1004* (2013.01); *H01M 8/0234* (2013.01); *H01M 8/1018* (2013.01);
(Continued)

(58) Field of Classification Search
CPC ........ H01M 8/10; H01M 4/90; H01M 8/1004; H01M 8/1018; H01M 8/0234;
(Continued)

(56) References Cited

U.S. PATENT DOCUMENTS 7,939,218 B2   5/2011   Niu
8,790,744 B2   7/2014   Wang et al.
(Continued)

FOREIGN PATENT DOCUMENTS

CN   1460638   12/2003
CN   1631848    6/2005
(Continued)

*Primary Examiner* — Alexander Usyatinsky
(74) *Attorney, Agent, or Firm* — ScienBiziP, P.C.

(57) ABSTRACT

A membrane electrode assembly includes a proton exchange membrane and at least one electrode located on the proton exchange membrane, wherein the at least one electrode includes a carbon fiber film. The carbon fiber film includes at least one carbon nanotube film including a number of carbon nanotubes joined end to end and extending along a same direction. Each of the number of carbon nanotubes is joined with a number of graphene sheets, and an angle is between a lengthwise direction of each of the number of graphene sheets and the number of carbon nanotubes.

10 Claims, 7 Drawing Sheets

(51) Int. Cl.
*H01M 8/1018* (2016.01)
*H01M 8/0234* (2016.01)
*H01M 4/90* (2006.01)
*H01M 4/92* (2006.01)

(52) U.S. Cl.
CPC ........ *H01M 4/9041* (2013.01); *H01M 4/9083* (2013.01); *H01M 4/926* (2013.01); *H01M 2008/1095* (2013.01); *H01M 2300/0082* (2013.01)

(58) Field of Classification Search
CPC ....... H01M 4/9041; H01M 2300/0082; H01M 4/9083; H01M 4/926; H01M 2008/1095
See application file for complete search history.

(56) References Cited

U.S. PATENT DOCUMENTS

| | | | |
|---|---|---|---|
| 8,840,991 B2 | 9/2014 | Liu et al. | |
| 2004/0121122 A1* | 6/2004 | Reynolds, III | H01M 8/0234 428/137 |
| 2006/0188774 A1 | 8/2006 | Niu et al. | |
| 2009/0098453 A1* | 4/2009 | Liu | H01M 4/133 429/163 |
| 2009/0117434 A1* | 5/2009 | Liu | H01M 8/0234 429/494 |
| 2009/0117437 A1 | 5/2009 | Liu et al. | |
| 2010/0124622 A1 | 5/2010 | Wang et al. | |
| 2011/0318568 A1* | 12/2011 | Liu | B82Y 30/00 428/315.5 |
| 2012/0028123 A1* | 2/2012 | Asari | H01G 11/36 429/231.8 |
| 2012/0103510 A1 | 5/2012 | Wang et al. | |
| 2012/0251766 A1 | 10/2012 | Jiang et al. | |
| 2012/0267581 A1 | 10/2012 | Cai et al. | |
| 2012/0276671 A1* | 11/2012 | Wei | H01L 21/0237 438/42 |
| 2012/0276672 A1* | 11/2012 | Wei | H01L 21/0237 438/42 |
| 2014/0057178 A1 | 2/2014 | He et al. | |
| 2014/0302394 A1* | 10/2014 | Yue | H01M 4/366 429/231.8 |

FOREIGN PATENT DOCUMENTS

| | | |
|---|---|---|
| CN | 1754277 | 3/2006 |
| CN | 101107734 A | 1/2008 |
| CN | 101425584 | 5/2009 |
| CN | 101425584 A | 5/2009 |
| CN | 101734618 | 6/2010 |
| CN | 101880036 | 11/2010 |
| CN | 101880036 A | 11/2010 |
| CN | 102049890 | 5/2011 |
| CN | 103199254 A | 7/2013 |
| CN | 103199254 | * 10/2013 |
| TW | 201241843 | 10/2012 |
| TW | 201242892 | 11/2012 |
| TW | 201409809 | 3/2014 |

* cited by examiner

MEMBRANE ELECTRODE ASSEMBLY OF FUEL CELL

CROSS-REFERENCE TO RELATED APPLICATIONS

This application claims all benefits accruing under 35 U.S.C. § 119 from China Patent Application No. 201410358042.2, filed on Jul. 25, 2014, in the China Intellectual Property Office. This application is related to commonly-assigned application entitled, "METHOD FOR MAKING CARBON FIBER FILM", concurrently filed Ser. No. 14/526,449; "CARBON FIBER FILM", concurrently filed Ser. No. 14/526,459; "CATHODE OF LITHIUM-ION BATTERY", concurrently filed Ser. No. 14/526,458. Disclosures of the above-identified applications are incorporated herein by reference.

FIELD

The present application relates to a membrane electrode assembly of fuel cell.

BACKGROUND

Fuel cells can generally be classified into alkaline, solid oxide, and proton exchange membrane fuel cells. The proton exchange membrane fuel cell has received more attention and has developed rapidly in recent years. Typically, the proton exchange membrane fuel cell includes a number of separated fuel cell work units. Each work unit includes a membrane electrode assembly (MEA), flow field plates (FFP), current collector plates (CCP), as well as related support equipments, such as blowers, valves, and pipelines.

The MEA generally includes a proton exchange membrane and two electrodes separately disposed on two opposite surfaces of the proton exchange membrane. Further, each electrode includes a catalyst layer and a gas diffusion layer. The catalyst layer is configured for being sandwiched between the gas diffusion layer and the proton exchange membrane. The material of the proton exchange membrane is selected from the group consisting of perfluorosulfonic acid, polystyrene sulfonic acid, polystyrene trifluoroacetic acid, phenol formaldehyde resin acid, and hydrocarbons. The catalyst layer includes catalyst materials and carriers. The catalyst materials are selected from the group consisting of metal particles, such as platinum particles, gold particles, and ruthenium particles. The carriers are generally carbon particles, such as graphite, carbon black, carbon fiber or carbon nanotubes. The gas diffusion layer is constituted of treated carbon cloth and carbon paper.

The gas diffusion layer of MEA is mainly formed by a carbon fiber paper. A process of making the carbon fiber paper is by the steps of: mixing carbon fibers, wood pulp, and cellulose fibers; using the mixture to obtain a paper pulp; and then forming the carbon fiber paper from the paper pulp. However, the process of making the carbon fiber paper has the following disadvantages: Firstly, the carbon fibers in the carbon fiber paper are not uniformly dispersed, thereby the gaps therein are uneven resulting in the carbon fibers having a small specific surface area. Thus, the structure restricts the gas diffusion layer to uniformly diffuse the gases, which is needed for the MEA. Secondly, the carbon fiber paper has high electrical resistance, thus, restricting the transfer of electrons between the gas diffusion layer and the external electrical circuit, thereby reducing the reaction activity of the MEA.

What is needed, therefore, is to provide a membrane electrode assembly of fuel cell that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
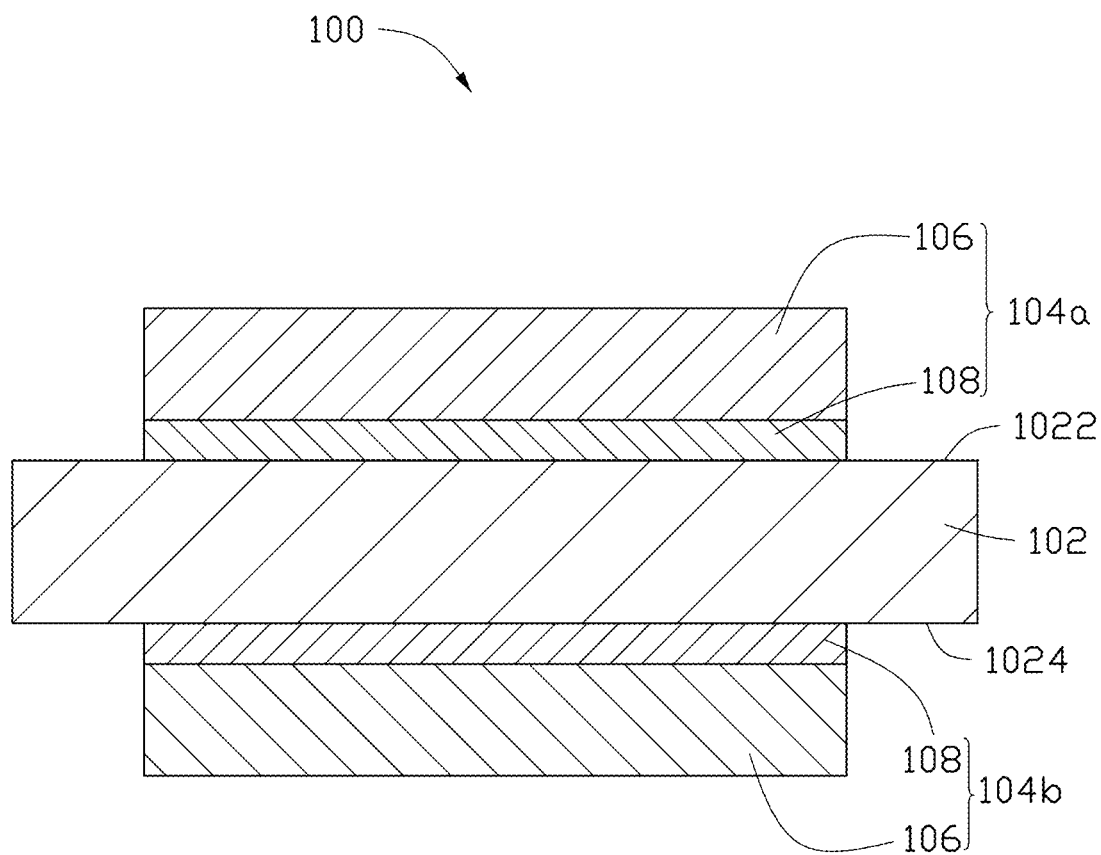
FIG. 1 is a schematic view of one embodiment of a membrane electrode assembly of a fuel cell.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a membrane electrode assembly 100 includes a proton exchange membrane 102, a first electrode 104a and a second electrode 104b. Both the first electrode 104a and the second electrode 104b include a gas diffusion layer 106 and a catalyst layer 108. The proton exchange membrane 102 has a first surface 1022 and a second surface 1024 opposite to the first surface 1022. The first electrode 104a is located adjacent to the first surface 1022 of the proton exchange membrane 102 and the second electrode 104b is located adjacent to the second surface 1024 of the proton exchange membrane 102. The catalyst layer 108 is configured for being sandwiched between the proton exchange membrane 102 and the gas diffusion layer 106.

Figure 2:
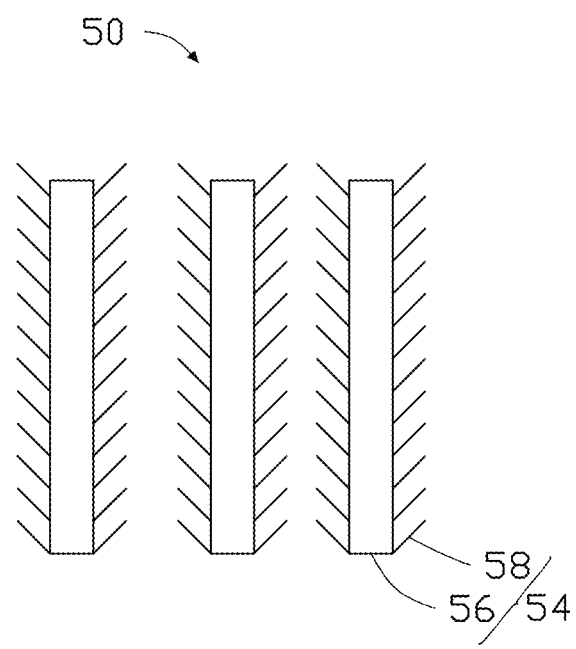
FIG. 2 is a schematic view of a carbon fiber film of the membrane electrode assembly of FIG. 1.
Figure 3:
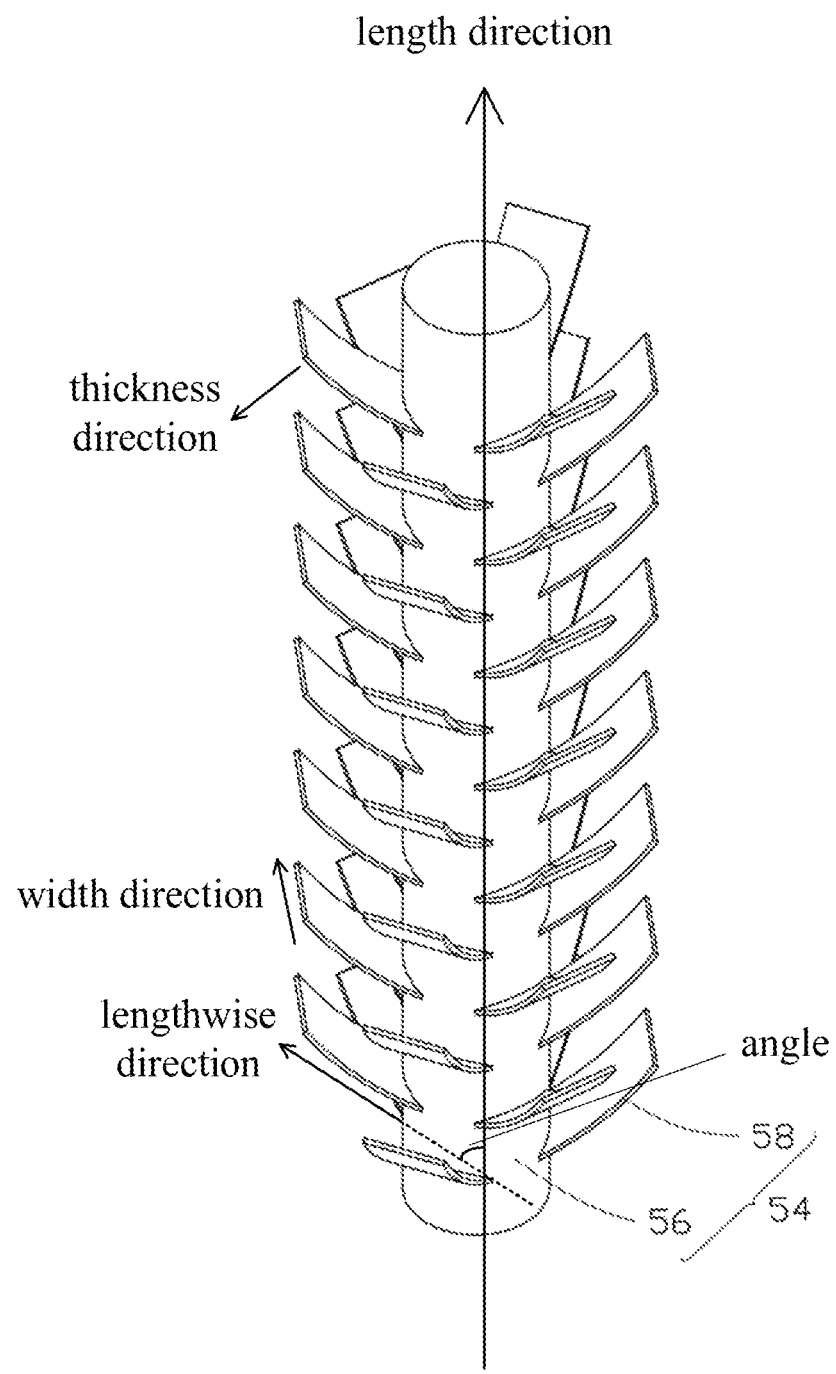
FIG. 3 is a three-dimensional schematic view of one carbon fiber of the carbon fiber film of FIG. 2.

The gas diffusion layer 106 includes a carbon fiber film 50. In one embodiment, the gas diffusion layer 106 is made of the carbon fiber film 50. Referring to FIGS. 2 and 3, the carbon fiber film 50 is a membrane structure. The carbon fiber film 50 includes a plurality of carbon nanotubes 56 and a plurality of graphene sheets 58. The plurality of carbon nanotubes 56 are joined end to end by van der Waals attractive force and extend along a same direction. Each of the plurality of carbon nanotubes 56 is surrounded by the plurality of graphene sheets 58. Part of edge of each of the plurality of graphene sheets 58 is joined with the carbon nanotube 56 by covalent bond. An angle is between each graphene sheet 58 and an outside wall of the carbon nanotube 56. The plurality of graphene sheets 58 are interval distribution on the outside wall of the carbon nanotube 56, and a distance between two adjacent graphene sheets 58 is arbitrary. The length of the plurality of graphene sheets 58 is greater than the diameter of the carbon nanotube 56 and ranges from about 50 nanometers to about 10 microns. The width of the plurality of graphene sheets 58 is similar to the diameter of the carbon nanotube 56 and ranges from about 10 nanometers to about 20 nanometers. An extending length of each graphene sheet 58 is 2.5 times -100 times as long as the diameter of the carbon nanotube 56.

The carbon fiber film 50 includes a plurality of carbon fibers 54 joined end to end. The plurality of carbon fibers 54 extends along a same direction. Each carbon fiber 54 includes a carbon nanotube 56 and the plurality of graphene sheets 58. The plurality of graphene sheets 58 forms a graphene layer. Two adjacent carbon fibers 54 are joined by van der Waals attractive force. In the carbon fiber film 50, two adjacent carbon fibers 54 side by side may be spaced apart from each other. Pores are defined in the carbon fiber film 50 by adjacent carbon fibers 54.

Figure 4:
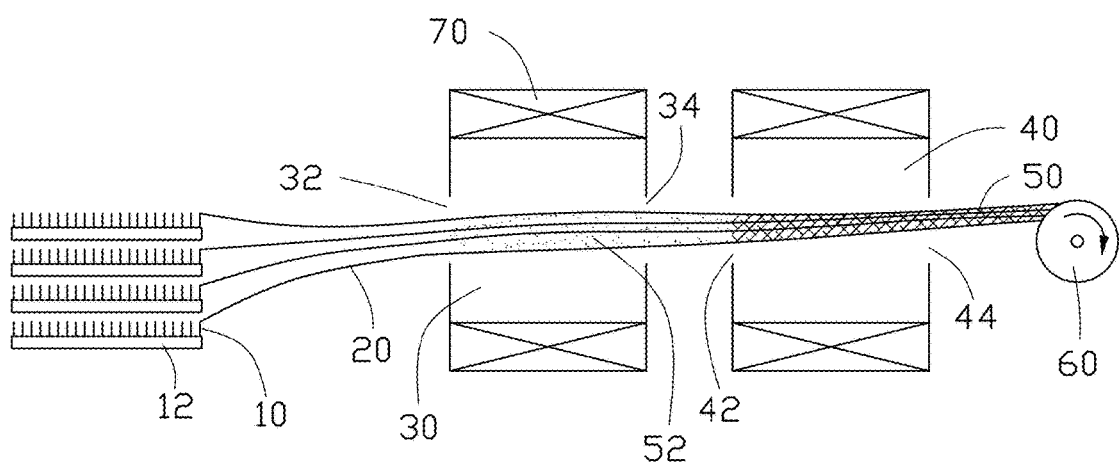
FIG. 4 is a schematic view of one embodiment of a device using for making the carbon fiber film of FIG. 2.

The plurality of carbon nanotubes 56 is uniformly distributed and substantially parallel to a surface of the carbon fiber film 50. The carbon fiber film 50 is a free-standing film and can bend to desired shapes without breaking The angle between each graphene sheet 58 and the carbon nanotube 56 can range from about 0 degrees to about 90 degrees. In one embodiment, the angle between each graphene sheet 58 and the carbon nanotube 56 is in a range from about 30 degrees to about 60 degrees. In one embodiment, the angles between each graphene sheet 58 and the carbon nanotube 56 are equal to 45 degrees, as shown in FIG. 4. A diameter of each carbon fiber 54 is related to the thickness of the carbon layer 52. The diameter of the plurality of carbon fibers 54 can be in a range from about 450 nanometers to about 100 microns. In one embodiment, the diameter of the plurality of carbon fibers 54 is about 500 nanometers.

The carbon fiber film 50 can include at least two stacked carbon nanotube films 20, adjacent carbon nanotube films 20 can be combined by only the van der Waals attractive force therebetween. Additionally, an angle between the extending directions of the carbon nanotubes in two adjacent carbon nanotube films 20 can be in a range from about 0 degrees to about 90 degrees. Stacking the carbon nanotube films 20 will improve the mechanical strength of the carbon fiber film 50. In one embodiment, the carbon fiber film 50 includes two layers of the carbon nanotube films 20, and the angle between the extending directions of the carbon nanotubes in two adjacent carbon nanotube films 20 is about 90 degrees.

The carbon fiber film 50 has good electrical conductivity. A sheet resistance of the carbon fiber film 50 is less than or equal to 100 ohm. Two adjacent carbon nanotubes 56 are joined end to end by combining a graphene sheet 58, and the graphene sheet 58 is combined with the two adjacent carbon nanotubes 56 by the covalent bond. Therefore, the mechanical strength of the carbon fiber film 50 is further improved.

Compare with traditional carbon fiber paper, the carbon fiber film 50 has great specific surface area because the angles formed between each graphene sheet 58 and the carbon nanotube 56, and accordingly, the gas diffusion layer 106 can uniformly diffuse the gases. The carbon fiber film 50 has low electrical resistance, thus, improving the transfer of electrons between the gas diffusion layer 106 and the external electrical circuit, thereby improving the reaction activity of the membrane electrode assembly 100.

The catalyst layer 108 can be made of metal particles and carbon particles. The metal particles are dispersed in the carbon particles, thereby forming the catalyst layer 18. The metal particles can be selected from the group consisting of platinum particles, gold particles, and ruthenium particles. The carbon particles can be selected from the group consisting of graphite, carbon black, carbon fiber, and carbon nanotubes. In one embodiment, the metal particles are platinum, and the carbon particles are carbon nanotubes. The distribution of the metal particles is less than 0.5 mg/cm$^2$ (milligram per square centimeter).

The material of the proton exchange membrane 102 is selected from the group consisting of perfluorosulfonic acid, polystyrene sulfonic acid, polystyrene trifluoroacetic acid, phenol-formaldehyde resin acid, and hydrocarbons.

A method for making the above-described membrane electrode assembly 10 is provided in one embodiment. The method includes the steps of:

(S10), fabricating a carbon fiber film 50 to act as a gas diffusion layer 106;

(S11), forming a catalyst layer 108 on the carbon fiber film 50 to obtain a first electrode 104a and a second electrode 104b; and (S12), providing a proton exchange membrane 102, and disposing the first electrode and the second electrode on opposite surfaces of the proton exchange membrane 102 respectively.

Referring to FIG. 4, a method for making the carbon fiber film 50 of one embodiment includes the following steps:

(S101), providing a carbon nanotube array 10;

(S102), forming a carbon nanotube film 20 by pulling from the carbon nanotube array 10, and making the carbon nanotube film 20 successively pass through a first room 30 and a second room 40;

(S103), supplying a carrier gas and a carbon source gas to the first room 30 and forming a carbon layer 52 on the carbon nanotube film 20 located in the first room 30 by controlling a temperature of the first room 30, wherein the carbon nanotube film 20 and the carbon layer 52 form a carbon nanotube composite film; and (S104), taking the carbon nanotube composite film into the second room 40 from the first room 30, and graphitizing the carbon layer 52 by controlling a temperature of the second room.

In the step (S101), the carbon nanotube array 10 can be a super-aligned array formed by a chemical vapor deposition method. The chemical vapor deposition method for making the carbon nanotube array generally includes the following steps:

(S1011), providing a substrate 12, wherein the substrate 12 can be a substantially flat and smooth silicon substrate with a diameter of 4 inches, and the silicon substrate can be a P-type silicon wafer, an N-type silicon wafer or a silicon wafer formed with an oxidized layer thereon. In one embodiment, a 4-inch, P-type silicon wafer is used as the substrate 12.

(S1012), forming a catalyst layer on the substrate 12, wherein the catalyst layer is made of a material selected from the group consisting of iron (Fe), cobalt (Co), nickel (Ni), and an alloy thereof. In one embodiment, the catalyst layer is Fe;

(S1013), annealing the substrate 12 with the catalyst layer in air at a temperature in a range from 700° C. to 900° C. for about 30 minutes to about 90 minutes; and (S1014), providing a carbon source gas at high temperature to a furnace for about 5 minutes to about 30 minutes to grow the carbon nanotube array 10 on the substrate 12, wherein the substrate 12 has been put in the furnace which has been heated to a temperature of 400° C.-740° C. and is filled with a protective gas. The carbon source gas can be, e.g., methane, ethylene, propylene, acetylene, methanol, ethanol, or a mixture thereof. The protective gas can, preferably, be made up of at least one of nitrogen (N2), ammonia (NH3), and a noble gas.

Moreover, the carbon nanotube array 10 formed under the above conditions is essentially free of impurities such as carbonaceous or residual catalyst particles. The carbon nanotube array 10 includes a plurality of carbon nanotubes parallel to each other and perpendicular to a top surface of the substrate 12.

In the step (S102), the carbon nanotube film 20 is obtained by extracting a portion of the carbon nanotube array 10 by the substeps of :

(S1021), selecting some carbon nanotube segments of the carbon nanotube array 10 having a determined width, and then using a drawing tool with the predetermined width to secure the end of the carbon nanotube segments of the carbon nanotube array 10; and (S1022), pulling the drawing tool away from the carbon nanotube at an even/uniform speed to make the carbon nanotube segments of the carbon nanotube array 10 separate from the carbon nanotube array 10.

In the step (S1022), the pulling direction can be substantially perpendicular to the growing direction of the carbon nanotube array 10. The drawing tool can be a nipper, a clamp, an adhesive tape, and so on.

In the step (S1022), during the extracting process, when the end of the carbon nanotube segments of the carbon nanotubes of the carbon nanotube array 10 is drawn out, other carbon nanotube segments are also drawn out in a manner that ends of a carbon nanotube is connected with ends of adjacent carbon nanotubes, by the help of the van der Waals attractive force between the ends of carbon nanotube segments. This characteristic of the carbon nanotubes ensures that a continuous carbon nanotube film 20 can be formed.

A width of the carbon nanotube film 20 is related to a size of the carbon nanotube array 10. A length of the carbon nanotube film 20 can be selected according to need. In one embodiment, when the carbon nanotube array 10 is 4-inch, the width of the carbon nanotube film 20 is in a range from about 0.5 nanometers to about 10 centimeters, and a thickness of the carbon nanotube film 20 is in a range from about 0.5 nanometers to about 10 microns.

Figure 5:
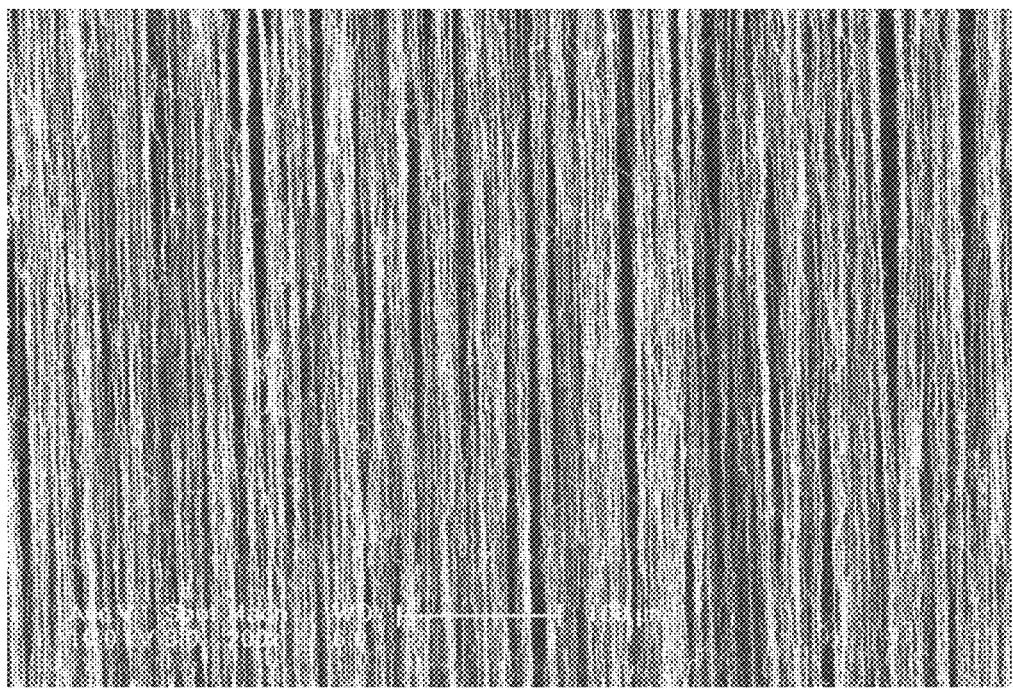
FIG. 5 is a scanning electron microscope (SEM) image of a carbon nanotube film.

Referring to FIG. 5, the carbon nanotube film 20 includes a plurality of carbon nanotubes uniformly distributed therein. The plurality of carbon nanotubes can be combined by van der Waals attractive force. The carbon nanotube film 20 can be a substantially pure structure of the carbon nanotubes, with few impurities. The plurality of carbon nanotubes may be single-walled, double-walled, multi-walled carbon nanotubes, or their combinations. The carbon nanotubes which are single-walled have a diameter of about 0.5 nanometers (nm) to about 50 nm. The carbon nanotubes which are double-walled have a diameter of about 1.0 nm to about 50 nm. The carbon nanotubes which are multi-walled have a diameter of about 1.5 nm to about 50 nm.

The carbon nanotube film 20 is a free-standing film. The term "free-standing" includes, but not limited to, the carbon nanotube film 20 that does not have to be supported by a substrate. For example, the free-standing carbon nanotube film 20 can sustain the weight of itself when it is hoisted by a portion thereof without any significant damage to its structural integrity. So, if the free-standing carbon nanotube film 20 is placed between two separate supporters, a portion of the free-standing carbon nanotube film 20, not in contact with the two supporters, would be suspended between the two supporters and yet maintain film structural integrity.

The first room 30 can define a first inlet opening 32 and a first outlet opening 34 opposite to the first inlet opening 32. The second room 40 can define a second inlet opening 42 and a second outlet opening 44 opposite to the second inlet opening 42. The carbon nanotube film 20 is successively pass through entire first room 30 and entire second room 40 by using the drawing tool, and fixed on a supporting shaft 60, as shown in FIG. 1. The supporting shaft 60 can rotate around its axis, the carbon nanotube film 20 can be collected on the supporting shaft 60.

In the step (S103), forming the carbon layer 52 on the carbon nanotube film 20 includes the following steps:

(S1031), supplying the carrier gas to the first room 30;

(S1032), supplying the carbon source gas to the first room 30; and (S1033), heating the first room 30 to a temperature from about 800 degrees Celsius to about 1000 degrees Celsius, and cracking the carbon source gas to form a plurality of amorphous carbons, wherein the plurality of amorphous carbons is deposited on the carbon nanotube film 20 in the first room 30.

In the step (S1031), the first room 30 can be purified by the carrier gas. The carrier gas includes nitrogen, ammonia, or inert gas, such as argon. A flow speed of the carrier gas can range from about 50 sccm to about 100 sccm.

In the step (S1032), the carbon source gas can be a hydrocarbon compound, such as alkyne. A flow speed of the carrier gas can range from about 20 sccm to about 100 sccm.

In the step (S1033), a heater 70 surrounds the first room 30 and heats the first room 30 to the temperature from about 800 degrees Celsius to about 1000 degrees Celsius. In one embodiment, when a time of supplying the carbon source gas ranges from about 30 minters to about 60 minters, a thickness of the carbon layer 52 ranges from about 5 nanometers to about 10 microns. In order to uniformly cover the carbon nanotube film 20 and enclose each of the plurality of carbon nanotubes, the thickness of the carbon layer 52 is greater than or equal to 5 nanometers. The thickness of a composite structure including the carbon layer 52 and the carbon nanotube film 20 is greater than or equal to 30 nanometers.

In the process of forming the carbon layer 52, a pressure in the first room 30 can be in a range from about 50 Pa to about 1000 Pa. The carbon nanotube film 20 cannot be destroyed because the inert gas is in the first room 30 and the pressure in the first room 30 ranges from about 50 Pa to about 1000 Pa.

The carrier gas and the carbon source gas can be simultaneously supplied to the first room 30. At this time, the flow speed of the carrier gas ranges from about 10 sccm to about 50 sccm. In one embodiment, the carrier gas and the carbon source gas are simultaneously supplied to the first room 30, the flow speed of the carrier gas is 25 sccm, and the flow speed of the carbon source gas is 50 sccm.

The carbon nanotube film 20 defines a plurality of micropores, which is formed by two adjacent carbon nanotubes of the carbon nanotube film 20. The plurality of amorphous carbons formed by cracking the carbon source gas is deposited on a surface of the plurality of carbon nanotubes, and deposited in the plurality of micropores. The carbon layer 52 thus encloses each of the plurality of carbon nanotubes.

In the step (S104), the supporting shaft 60 is rolled, and the carbon nanotube film 20 continues to be pulled from the carbon nanotube array 10. The carbon nanotube composite film in the first room 30 is passed through the first outlet opening 34 and the second inlet opening 42 and into the second room 40.

There is a vacuum in the second room 40. A pressure in the second room 40 ranges from about 50 Pa to about 1000 Pa. The heater 70 surrounds the second room 40 and heats the second room 40 to a temperature from about 2000 degrees Celsius to about 3000 degrees Celsius. The carbon layer 52 thus is graphitized. A plurality of carbons of the carbon layer 52 is changed to $SP^2$ hybrid structure joined with covalent bond from amorphous. The carbon nanotube film 20 cannot be destroyed in the second room 40 because the vacuum is in the second room 40. The plurality of carbon nanotubes of the carbon nanotube film 20 is $SP^2$ hybrid graphene layer structure. Original structure defects of the plurality of carbon nanotubes in the carbon nanotube film 20 can be repaired by heating in the vacuum.

In one embodiment, when the thickness of the carbon layer 52 is greater than a diameter of the plurality of carbon nanotubes, after graphitizing the carbon layer 52 to form a plurality of graphene sheets, it is difficult for the graphene sheets to be parallel to extending directions of the carbon nanotubes. Therefore, an angle can be formed between each graphene sheet and each carbon nanotube. In one embodiment, the thickness of the carbon layer 52 is greater than or equal to 100 nanometers.

A length of the plurality of graphene sheets is greater than the diameter of the plurality of carbon nanotubes and in a range from about 50 nanometers to about 10 microns. A width of the plurality of graphene sheets is in a range from about 10 nanometers to about 20 nanometers. A time for graphitizing the carbon layer 52 is related to the thickness of the carbon layer 52. The greater the thickness of the carbon layer 52, the longer the time lasts. In one embodiment, the thickness of the carbon layer 52 is in a range from about 100 nanometers to about 10 microns, the time for graphitizing the carbon layer 52 is in a range from about 20 minutes to about 60 minutes.

The carbon layer 52 is graphitized to the plurality of graphene sheets, and the plurality of graphene sheets is joined with the carbon nanotube film 20, thus the carbon fiber film 50 is formed.

The supporting shaft 60 is rolled along the direction of pulling the carbon nanotube film 20, and the carbon nanotube film 20 continues to be pulled from the carbon nanotube array 10, at the same time the carbon layer 52 in the first room 30 is passed through the first outlet opening 34 and the second inlet opening 42 and into the second room 40 and graphitized in the second room 40.

In practical use, the carbon fiber film 50 can, beneficially, be cut into any desired shape and size. As such, it is easily applied to use in a fuel cell, especially, in a micro-type of fuel cell acting as a gas diffusion layer 106.

In the step (S11), the catalyst layer 18 is formed by the substeps of:

(S110), putting metal particles and carbon particles into a dispersion solution;

(S111), adding water and a surface active agent to the dispersion solution to obtain a catalyst slurry;

(S112), coating the catalyst slurry on the carbon fiber film 50 and drying the catalyst slurry, thereby forming the catalyst layer 108 on the carbon fiber film 50.

In the step (S110), the metal particles are selected from the group consisting of platinum particles, gold particles and ruthenium particles. The carbon particles are selected from the group consisting of graphite, carbon black, carbon fibers, and carbon nanotubes. The metal particles are loaded on surfaces of the carbon particles. Further, loading of the metal particles is less of 0.5 mg/cm$^2$. The carbon particles have the properties of high conductivity, a high specific surface area, and good corrosion resistance. In order to enhance the dispersion of carbon particles in the dispersion solution, a ball mill refiner is used to mill the carbon particles. CHF 1000 resin is dissolved in dimethyl acetamide to form the dispersion solution. A mass percent of the CHF 1000 resin in the dispersion solution is about 5%.

In the step (S111), the surface active agent is used to restrain agglomeration of the carbon particles. Thus, in one embodiment, isopropanol is used as the surface active agent. After the water and the surface active agent are added into the dispersion solution, a process of dispersing the dispersion solution is executed by an ultrasonic dispersing or an agitating.

In the step (S112), a process of coating is executed by a spraying method, an immersing method, or a screen printing method. The above-described methods can ensure that the catalyst slurry is uniformly and densely coated on the carbon nanotube film. In order to reduce the cracks and voids in the catalyst layer 108, the drying method is executed at a low temperature. The drying process can be selected from the group consisting of an oven drying method and a sintering method. The first electrode 104a and the second electrode 104b are formed.

In one embodiment, the catalyst slurry is coated on the surface of the carbon fiber film 50, and both the plurality of graphene sheets 58 and the plurality of carbon nanotubes 56 are covered by the catalyst slurry. Thus, the carbon fiber film 50 is in contact with the catalyst layer 108, improving work efficiency of the gas diffusion layer 106.

In the step (S12), the first electrode 104a and the second electrode 104b are attached on the two opposite surfaces of the proton exchange membrane 102 by a conducting adhesive using a heat pressing process. Further, the catalyst layer 108 is located between the gas diffusion layer 106 and the proton exchange membrane 102.

Figure 6:
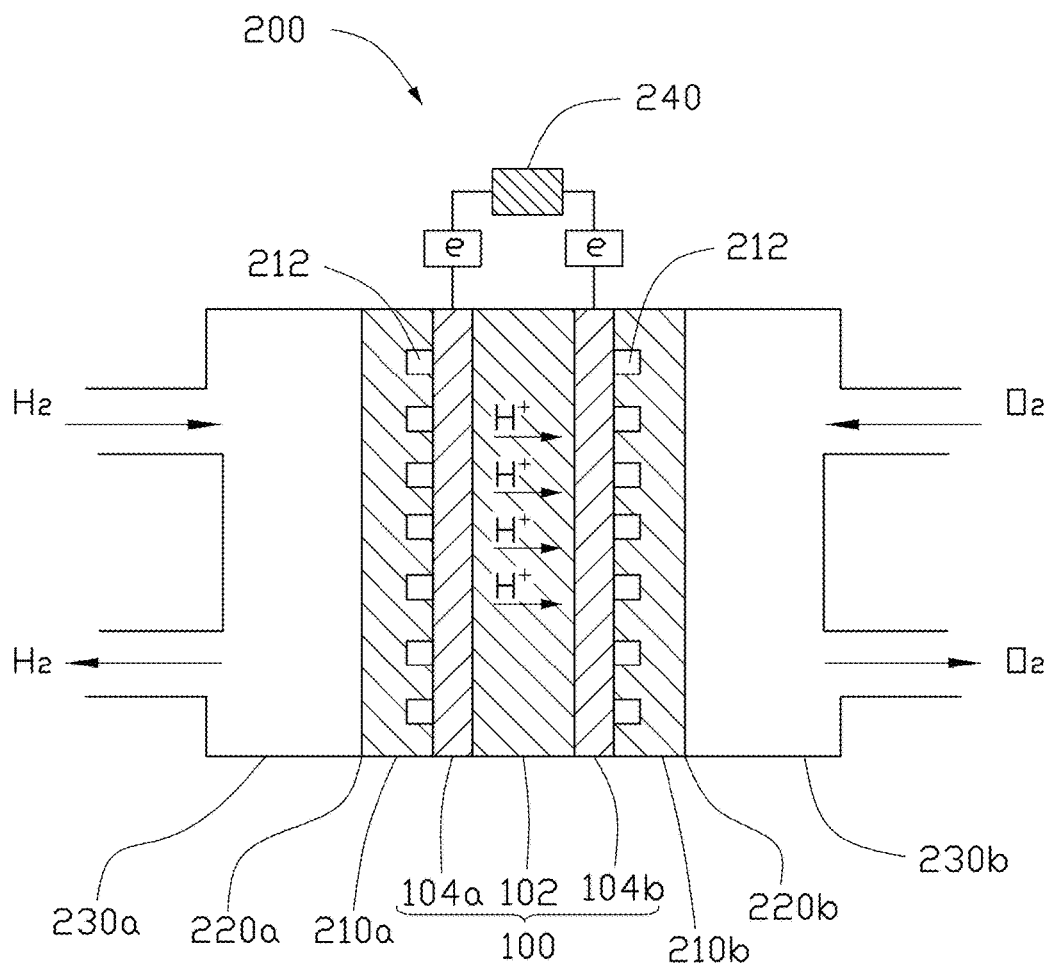
FIG. 6 is a schematic view of one embodiment of the fuel cell.

Referring to FIG. 6, a fuel cell 200 includes a membrane electrode assembly (MEA) 100, a first flow field plates (FFP) 210a and a second FFP 210b, a first current collector plates (CCP) 220a and a second CCP 220b, as well as a first support equipment 230a and a second support equipment 230b.

The first FFP 210a is located adjacent to a surface of the first electrode 140a facing away from the proton exchange membrane 102. The second FFP 210b is located adjacent to a surface of the second electrode 140b facing away from the proton exchange membrane 102. Both the first FFP 210a and the second FFP 210b have at least one flow field groove 212. The at least one flow field groove 212 is contacted with the first electrode 140a and the second electrode 140b. Thus, the at least one flow field groove 212 is used to transport the fuel gases, the oxidant gases, and the reaction product (e.g., water). The first FFP 210a and the second FFP 210b are made of metals or conductive carbon materials.

The first CCP 220a is located adjacent to a surface of the first FFP 210a facing away from the proton exchange membrane 102. The second CCP 220b is located adjacent to a surface of the second FFP 210b facing away from the proton exchange membrane 102. Thus, the first CCP 220a and second CCP 220b are used to collect and conduct the electrons generated by the work process of MEA 100. The first CCP 220a and the second CCP 220b are made of conductive materials such as metal. In one embodiment, the carbon fiber film 50 has excellent conductivity and can collect and conduct the electrons, the carbon fiber film 50 can perform all of the functions of the first CCP 220a and the second CCP 220b, thus eliminating the need for the first CCP 220a and the second CCP 220b.

The first support equipment 230a and the second support equipment 230b include blowers, valves, and pipelines. The blower is connected with the first FFP 210a and the second 210b via pipelines. The blowers blow the fuel gases and the oxidant gases. In one embodiment, the fuel gases are oxygen, and the oxidant gases are hydrogen.

In the working process of the fuel cell 200, oxygen is applied to the first electrode 104a and hydrogen is applied to the second electrode 104b. In the second electrode 104b, after the hydrogen has been applied to the catalyst layer 108, a reaction of each hydrogen molecule is as follows: $H_2 \rightarrow 2H^+ + 2e$. The hydrogen ions are generated by the above-described reaction reach the cathode through the proton exchange membrane 102. At the same time, the electrons generated by the reaction also arrive at the first electrode 104a by an external electrical circuit. In the first electrode 104a, oxygen is also applied to the catalyst layer 108. Thus, the oxygen reacts with the hydrogen ions and electrons as shown in the following equation: $1/2O_2 + 2H^+ + 2e \rightarrow H_2O$. In the electrochemical reaction process, the electrons generate an electrical current, and as a result, are able to output electrical energy to the load 240.

Figure 7:
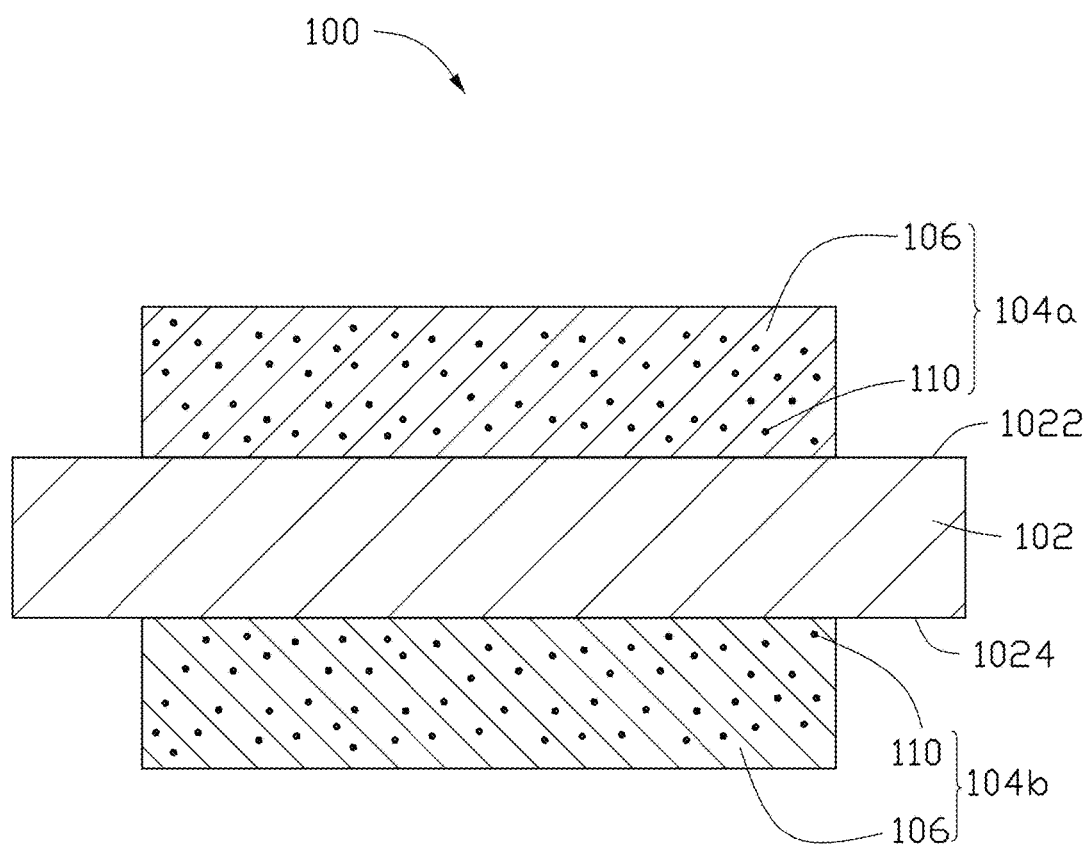
FIG. 7 is a schematic view of another embodiment of the fuel cell.

Referring to FIG. 7, an embodiment of a membrane electrode assembly 300 is shown where both the first electrode 104a and the second electrode 104b include the gas diffusion layer 106 and a plurality of catalyst particles 110 dispersing on the gas diffusion layer 106.

The catalyst particles 110 comprise metal particles and carbon particles. The metal particles can be selected from the group consisting of platinum particles, gold particles and ruthenium particles. The carbon particles can be selected from the group consisting of graphite, carbon black, carbon fibers, and carbon nanotubes. In one embodiment, the catalyst particles 110 are deposited on the surface of the graphene sheets 58 and the surface of the carbon nanotubes 56, of the carbon fiber film 50. The catalyst particles 110 can be deposited in the pores defined in the carbon fiber film 50 by adjacent carbon fibers 54.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A membrane electrode assembly comprising:
   a proton exchange membrane; and
   at least one electrode on the proton exchange membrane, wherein the at least one electrode comprising:
   at least one carbon nanotube film comprising a plurality of carbon nanotubes joined end to end and extending along a same direction;
   wherein each of the plurality of carbon nanotubes is joined with a plurality of graphene sheets, and an angle is defined between a lengthwise direction of each of the plurality of graphene sheets and a length direction of each of the plurality of carbon nanotubes, and the angle is from about 30 degrees to about 60 degrees.

2. The membrane electrode assembly of claim 1, wherein an outside wall of each of the plurality of carbon nanotubes is joined with the plurality of graphene sheets by a covalent bond.

3. The membrane electrode assembly of claim 1, wherein the plurality of carbon nanotubes is substantially parallel to a surface of the at least one carbon nanotube film.

4. The membrane electrode assembly of claim 1, further comprising a negative current collector, and the carbon fiber film is located on the negative current collector.

5. The membrane electrode assembly of claim 1, wherein the plurality of graphene sheets is distributed on an outside wall of the plurality of carbon nanotubes.

6. The membrane electrode assembly of claim 1, wherein a length of the plurality of graphene sheets is greater than a diameter of the plurality of carbon nanotubes.

7. The membrane electrode assembly of claim 1, wherein a width of the plurality of graphene sheets is from about 10 nanometers to about 20 nanometers.

8. The membrane electrode assembly of claim 1, wherein an extending length of each of the plurality of graphene sheets is 2.5 times-100 times as long as a diameter of each of the plurality of carbon nanotubes.

9. A membrane electrode assembly comprising:
   a proton exchange membrane; and
   at least one electrode located on the proton exchange membrane, wherein the at least one electrode comprises a carbon fiber film comprising:
   a plurality of carbon nanotube films comprising a plurality of carbon nanotubes extending along a same direction;

wherein each of the plurality of carbon nanotubes is surrounded by a plurality of graphene sheets and joined with the plurality of graphene sheets, and an angle is defined between a lengthwise direction of each of the plurality of graphene sheets and a length direction of each of the plurality of carbon nanotubes, the angle is from about 30 degrees to about 60 degrees.

10. The membrane electrode assembly of claim 9, wherein an angle between extending directions of the plurality of carbon nanotubes in two adjacent carbon nanotube films is from about 0 degrees to about 90 degrees.

* * * * *